June 20, 1950 M. ALDEN 2,511,893
PORTABLE ELECTRIC LIGHT FOR CONNECTION
WITH A MOTOR VEHICLE
Filed Feb. 19, 1949 2 Sheets-Sheet 2
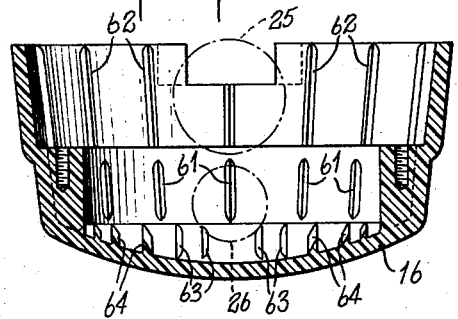
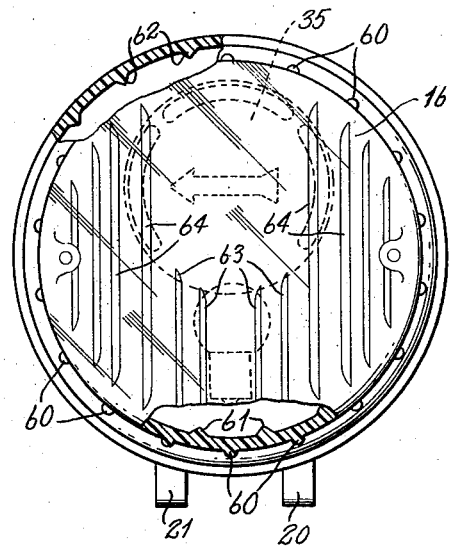
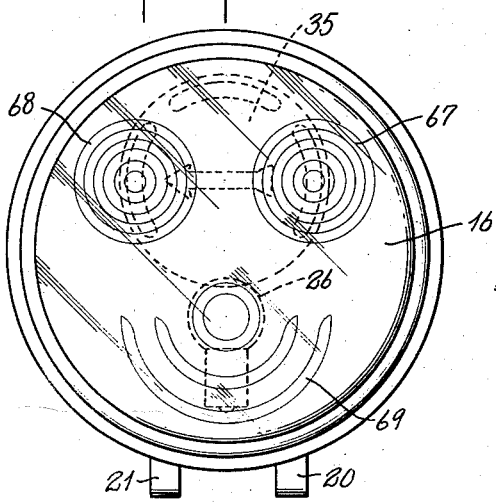
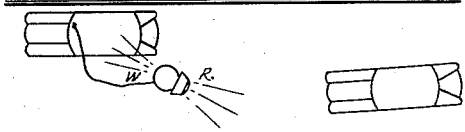
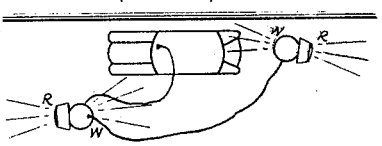
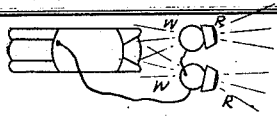
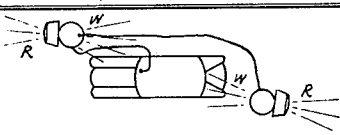
INVENTOR.
MILTON ALDEN
BY
ATTORNEY Patented June 20, 1950

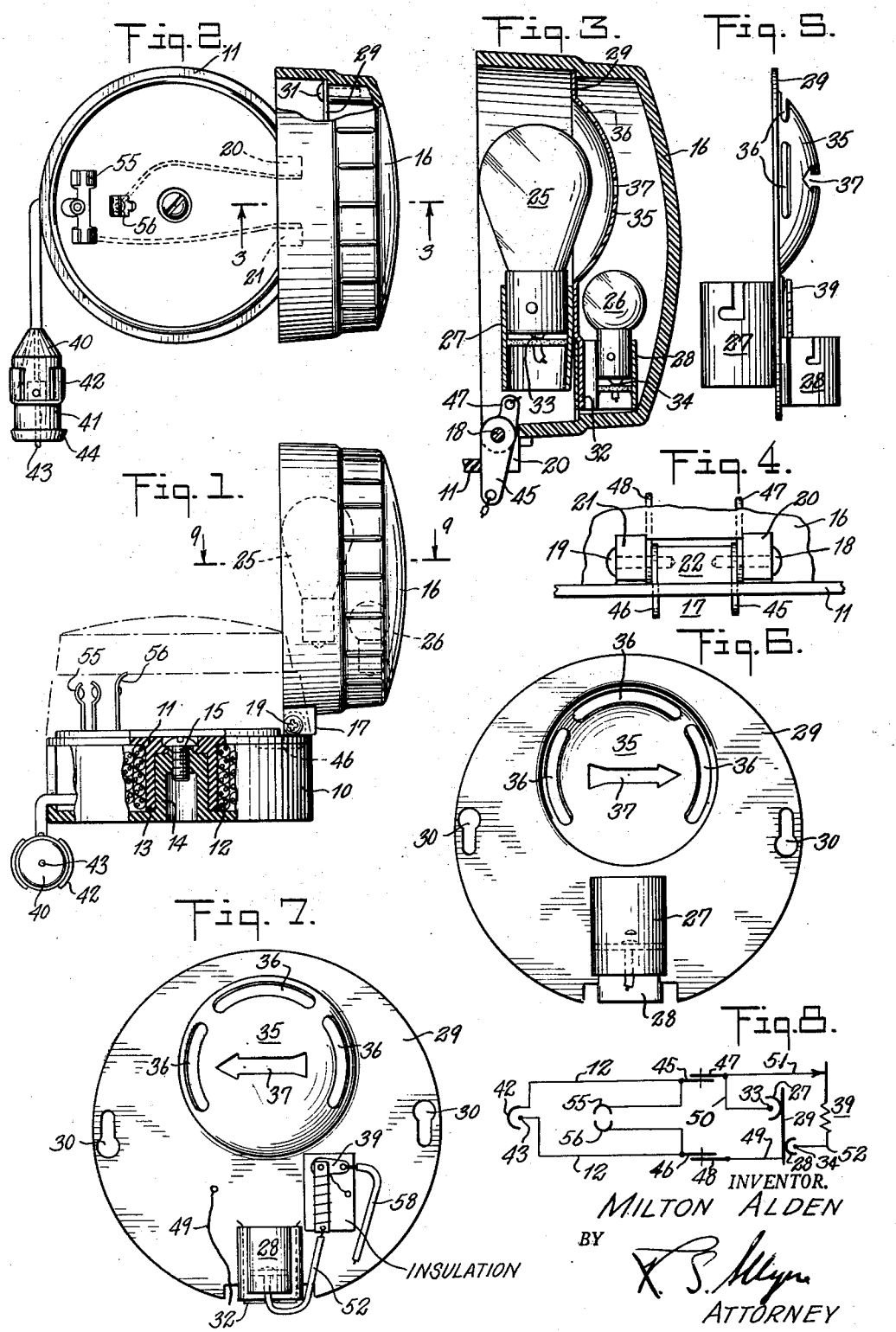

2,511,893

UNITED STATES PATENT OFFICE 2,511,893

PORTABLE ELECTRIC LIGHT FOR CONNECTION WITH A MOTOR VEHICLE

Milton Alden, Brockton, Mass.

Application February 19, 1949, Serial No. 77,341

12 Claims. (Cl. 177—329)

My invention relates particularly to combination illuminating and signal lights suitable especially in connection with motor vehicles.

At night serious accidents frequently occur when a car is disabled and is parked by the side of the road for repairs or waiting for help. Traffic, from the rear especially, crashes into the car or into some one standing or working alongside the car. This may be due to lack of a tail light or from inattention or to fog or because the driver is blinded by approaching head lights.

I have accordingly provided a signal light with an extension cord adapted to be plugged into a cigar lighter socket on the car. Such a light is portable and adapted to be set on the ground or on the rear of the car where it will be seen by the driver approaching from the rear. This light preferably has a "blinker" as added precaution and also has a lamp for illuminating the car and roadway. Such a device is also adapted for aid in reading in the car or illuminating the motor.

The lamps are preferably mounted on a reflector and enclosed in a translucent red dome-like cover, but the cover may be of clear glass or plastic and depend upon a red bulb for signal purposes. The cover may be provided with prismatic elements at the front for directing the rays of the illuminating lamp bulb at any desired angle. The cover may be formed as a lens. For greater convenience, the conductor cord may be carried by a reel and the cover hinged to the reel so that it can be folded up for storage and opened out for better directing the rays from the lamp bulbs.

Fig. 1 is a side view and partial section of the device, the cover being shown open for use and in dotted out lines closed.

Fig. 2 is a plan view of the same.

Fig. 3 is a side view and section of the cover and attached parts on a larger scale.

Fig. 4 is a fragmentary rear view showing the hinge detail.

Fig. 5 is an edge view of the reflector and attached lamp sockets.

Fig. 6 is a front view of the reflector with the lamp socket for the illuminating lamp.

Fig. 7 is a rear view of the reflector with the socket for the signal lamp and the blinker switch.

Fig. 8 is a diagram of the electric circuits.

Fig. 9 is a horizontal sectional view of the cover taken on the plane of the line 9—9 of Fig. 1 showing the prismatic ribs.

Fig. 10 is a rear view of the cover and showing parts in section.

Fig. 11 is a rear view of the cover showing a modification of the prismatic ribs.

Fig. 12 is a diagrammatic plan showing a car with a signal lamp placed to cover the left rear wheel to deflect a car approaching from the rear.

Fig. 13 is a similar view with two lamps connected in series, one at the front left and the other at the rear right.

Fig. 14 shows two lamps at the rear of a car, one at each side.

Fig. 15 shows a car with one lamp at the right front and the other at the left rear.

In the form as shown there is a base 10 in the form of a cup, a plate 11 rotatably mounted on the base and constituting a cap for a reel for the cord 12. The plate 11 has a depending hollow hub 13 which is supported on the bearing post 14 and secured by a screw 15.

The cover 16 is hinged at 17 to the plate 11 by the pins or screws 18 and 19 which pass through the lugs 20 and 21 of the cover into the lug 22 of the plate 11.

The parts 10, 11 and 16 are preferably formed of a suitable moldable plastic material.

The cover 16 is transparent or translucent and preferably of a red or ruby color and shaped like a refracted lens at its closed face and open at its other face so that it may be folded to the closed position as shown by the dotted outline in Fig. 1 when not in use.

The lamp bulbs 25 and 26 are removably mounted in suitable sockets 27 and 28, respectively, which are carried by a reflecting partition disc 29 in the cover. This disc is preferably of sheet metal and has "key hole" slots 30 to enable it to be detachably mounted against the shoulder 29' on pins 31 which are embedded in the shoulder of the inner side walls of the cover. The resiliency of an embossed shoulder in disc 29 is sufficient to hold the disc in place.

These sockets which constitute the outer contacts for the sleeves of the bulbs 25 and 26 may be secured in any suitable manner to the supporting disc 29 for instance by welding socket 27 to the disc at one face and by securing socket 28 to a tongue 32. Each socket of course has an inner or center contact such as 33, 34 for the center lamp contacts.

The upper part of the disc 29 has a curved or embossed part 35 opposite the axis of the filament of the lamp bulb 25 which preferably has openings such as 36 and 37 to allow for passage of light above the signal lamp bulb 26. One of these openings 37 may be in the form of an arrow indicating the direction for the approaching driver to take in order to pass safely by the parked vehicle.

The smaller lamp bulb 26 is preferably provided with an automatic on and off or "blinker" switch 39 which is mounted on the disc 29 (see Fig. 7).

The plug at the outer end of the extension cord 12 is formed of two telescopically connected insulating parts 40 and 41 having the outer resilient contact wings 42 clamped between them and a center or tip contact 43 arranged respectively to engage the outer and inner contacts in a cigar lighter socket and having a shoulder 44 adapted to interlock with the bimetal finger of such a socket to hold the plug more securely in the socket.

In order to conductively connect the cord 12 to the lamp sockets in such a manner as to permit the convenient mounting and demounting of the lamps, I have provided washer-like tab elements which are mounted on the hinge pins 18 and 19. The lower ends of the tab elements 45 and 46 are bent over beneath plate 11 (see Fig. 1) and attached to the two wires of cord 12. Elements 47 and 48 extend up into the cover 16. Tab element 48 is connected by wire 49 to the reflector disc 29. Tab element 47 is connected by wire 51 to the center contact 33 for lamp bulb 25 which has socket 27 and is connected by wire 50 to the blinker switch 39 which in turn is connected by wire 52 to the center contact 34 for socket 28 and lamp bulb 26.

Tab 47 is held in frictional contact with tab 45 and turns with the cover on the hinge pins 19 and 20. Similarly tab 48 is in frictional contact with tab 46 and turns with the cover. The frictional connections in the hinge serve to hold the cover at any desired angle.

The main illuminating lamp bulb 25 may be easily removed for replacement in a conventional manner.

To obtain access to the signal lamp bulb 26, it is only necessary to loosen the reflector disc 29 and tilt it outwardly from the cover.

I also provide two contacts 55 and 56 on the plate 11 which are connected to the terminals 45 and 46 beneath the plate. These contacts may be designed and arranged to receive a plug, such as plug 40, on an extension cord for supplying current to or from another source or for extending current to another device such as herein set forth.

The contact member 56 is located and shaped so as to be engaged by the end of bulb 25 when the cover is closed and then hold the cover resiliently in the closed position ready to be stowed away in a convenient place, when the cord has been wound on the reel. The contact 55 similarly may engage the inner wall of the cover to hold it closed.

To use the device, it is merely necessary to draw out the cord, open the cover to get the device in position for whatever use may be intended such as for a danger signal or for reading or for examining some part of the motor or the area surrounding the motor.

The diagrammatic view of Fig. 8 shows one form of the circuits of the device.

Figs. 9 and 10 show ribs 60 arranged around the rim of the cover to increase the radiation of light and serve as a hand gripping area for turning the cover in order to wind in the cord.

Inside of the side walls are other ribs 61 and 62 to increase the radiation. On the inside of the dome are other prismatic ribs 63 and 64. These ribs may be arranged in various ways to produce an irregular radiation pattern directing the light at an angle for maximum visibility by an approaching car. A clear space in rear of the lamp 25 leaves a clear view of the directional arrow 37. The prisms 63 and 64 produce a special area of U-shape light. There is always light from the lamp 25 which is alternately augmented by the blinker lamp.

Alternate arrangements of the prismatic elements are shown in Fig. 11. For instance, Fresnel lens 67 and 68 and 69 may be arranged in the dome to produce intensive beams of light.

The diagrams of Figs. 12 to 15, inclusive, show some of the ways in which the invention may be used as a safety device on the road.

The uses and advantages of the device will be obvious from the foregoing specification.

It should be understood that modifications and changes in details might be made without departing from the principle or scope of the invention.

I claim:

1. A safety light comprising a base receptacle having a cap rotatably mounted on said base receptacle, a translucent cover carried by the cap, a lamp socket mounted in said cover and a reel for a flexible electric conductor cord carried by said cap in said receptacle and a cord on said reel connected to said lamp socket.

2. In a safety light, a translucent cover open at one side, a supporting reflector mounted in said cover, an electric illuminating lamp supported by said reflector at the open side of said cover and a blinking signal lamp carried at the opposite side of said reflector, said reflector having an opening to permit light from the first lamp to shine through said reflector and a base for supporting said cover.

3. A base receptacle, a cap having a reel rotatable in the base receptacle, a dome-shaped translucent cover hinged to the cap, a lamp socket mounted in said cover, circuit terminals mounted on the lower face of said cap connected to said lamp socket and terminals mounted on the upper face of said cap and connected to said socket, said cover fitting said cap and enclosing the upper terminals when closed.

4. A base receptacle, a cap having a reel rotatable in the base receptacle, a dome-shaped translucent cover hinged to the cap, lamp sockets mounted in said cover with a reflector between said sockets, circuit terminals mounted on the lower face of said cap connected to said lamp sockets and plug contacts mounted on the upper face of said cap and connected to said sockets, said cover fitting said cap and enclosing the upper terminals when closed.

5. A safety light comprising a base receptacle, a reel member mounted on said receptacle and having circuit terminals for a cord on said reel member on the inner face of said reel member and plug receiving contacts mounted on the outer face of said reel member in parallel with the cord terminals, a translucent cover hinged to said reel member, a lamp bulb socket mounted in said cover and connections from said cord terminals and from said plug contacts to said lamp bulb socket.

6. A safety light comprising a base receptacle, a reel member mounted on said receptacle and having circuit terminals for a cord on said reel member on the inner face of said reel member and plug receiving contacts mounted on the outer face of said reel member in parallel with the cord terminals, a translucent cover hinged to said reel member, a supporting reflector in said cover, a lamp bulb socket mounted on each face of said reflector and connections from said cord terminals and from said plug contact to said lamp bulb socket.

7. A safety light comprising a base having circuit terminals, a dome-shaped translucent cover hinged to the base, a metallic support detachably mounted in the cover, a lamp socket mounted on said support, a conductive member mounted in the hinge joint and connected between a circuit terminal and said support for said socket.

8. As an article of manufacture for insertion in the cover of a safety light, a supporting disc having an opening, a lamp bulb mounted on one face of said disc where light from it can shine at the front face of the disc and also through said opening, a second lamp bulb mounted on the opposite face of said disc and a blinker switch carried by said disc for flashing the light from the second lamp bulb at the rear of said disc.

9. An auto signal light comprising a base, a cap and reel mounted to rotate on the base, a translucent cover hinged to said cap, a lamp bulb mounted in the cover and movable therewith and auxiliary contacts carried by said cap, one of which contacts is resilient and serves to engage said lamp bulb to hold the cover in the closed position.

10. A safety light comprising a translucent dome having a cylindrical body with a lens at its end, a reflector in the dome having an illuminating lamp at its front face and a signal lamp at its rear face, said reflector having an opening to permit a portion of the light from the illuminating lamp to shine through to the rear and supplement the light from the signal lamp, the lens portion of the dome having parallel diffusing ribs at opposite sides of its central portion.

11. A safety light comprising a hollow supporting member, a reflector plate removably mounted in said hollow member, a socket for an illuminating lamp mounted at the front face of said reflector so that light can be reflected forwardly for illuminating the place where work is to be done and a socket for a blinking light mounted at the rear face of the reflector, said reflector having an opening in line with the front lamp so that light from the illuminating lamp will shine through the opening and provide continuous light at the rear supplementing the intermittent blinking light.

12. A safety light comprising a supporting member having circuit terminals, a dome shaped translucent cover, electric-conductive hinges connecting said cover to said supporting member, a reflector disc mounted in said cover, a lamp socket carried by said disc at one face thereof for carrying a main lamp for illuminating the area of work to be done, a lamp socket mounted on the opposite face of said disc for carrying a signal lamp, a blinker switch carried by said disc for turning on and off the circuit of the signal lamp independently of the main lamp, and circuit connections from said terminals to said sockets and switch including said hinges.

MILTON ALDEN.

REFERENCES CITED

The following references are of record in the file of this patent:

UNITED STATES PATENTS

| Number | Name | Date |
|---|---|---|
| 1,330,974 | Bauman et al. | Feb. 7, 1920 |
| 1,656,648 | Ritz Woller | Jan. 17, 1928 |
| 2,053,591 | Wiley | Sept. 8, 1936 |
| 2,224,742 | Muldoon | Dec. 10, 1940 |
| 2,408,568 | McClure | Oct. 1, 1946 |